(12) United States Patent
George et al.

(10) Patent No.: US 12,119,470 B2
(45) Date of Patent: Oct. 15, 2024

(54) BATTERY COMPARTMENT

(71) Applicant: McLaren Automotive Limited, Woking (GB)

(72) Inventors: Sunoj Cherian George, Woking (GB); James Douglas McLaggan, Woking (GB); Elie Talj, Woking (GB)

(73) Assignee: McLaren Automotive Limited, Woking (GB)

( * ) Notice: Subject to any disclaimer, the term of this patent is extended or adjusted under 35 U.S.C. 154(b) by 779 days.

(21) Appl. No.: 17/277,254

(22) PCT Filed: Sep. 17, 2019

(86) PCT No.: PCT/GB2019/052606
§ 371 (c)(1),
(2) Date: Mar. 17, 2021

(87) PCT Pub. No.: WO2020/058693
PCT Pub. Date: Mar. 26, 2020

(65) Prior Publication Data
US 2022/0037716 A1    Feb. 3, 2022

(30) Foreign Application Priority Data
Sep. 18, 2018  (GB) ................................. 1815190

(51) Int. Cl.
*H01M 10/6556* (2014.01)
*H01M 10/42* (2006.01)
*H01M 10/613* (2014.01)
*H01M 10/625* (2014.01)
*H01M 50/172* (2021.01)
*H01M 50/213* (2021.01)
*H01M 50/284* (2021.01)
*H01M 50/291* (2021.01)

(52) U.S. Cl.
CPC ..... *H01M 10/6556* (2015.04); *H01M 10/425* (2013.01); *H01M 10/613* (2015.04); *H01M 10/625* (2015.04); *H01M 50/213* (2021.01); *H01M 50/284* (2021.01); *H01M 50/291* (2021.01); *H01M 2220/20* (2013.01)

(58) Field of Classification Search
None
See application file for complete search history.

(56) References Cited

FOREIGN PATENT DOCUMENTS

| CH | 688012 A5 * | 4/1997 | ........... H02G 15/013 |
|---|---|---|---|
| CN | 203574011 U | 4/2014 | |

(Continued)

OTHER PUBLICATIONS

GB Search Report issued in GB Application No. GB1815190.2, date of search Jan. 28, 2019. 3 pages.

(Continued)

*Primary Examiner* — Zhongqing Wei
(74) *Attorney, Agent, or Firm* — Mintz Levin Cohn Ferris Glovsky and Popeo, P.C.

(57) ABSTRACT

A battery compartment for holding a plurality of cells, the battery compartment comprising a housing defining a chamber in which the plurality of cells are to be located, a cell tray for supporting the plurality of cells within the chamber and a plurality of openings in a wall of the housing, each opening allowing the passage of electrical cabling through the wall and also coolant flow into or out of the chamber.

19 Claims, 8 Drawing Sheets

(56) References Cited

FOREIGN PATENT DOCUMENTS

KR     20170138200 A  * 12/2017
WO     WO-2012/075948 A1   6/2012
WO     WO-2020/058693 A1   3/2020

OTHER PUBLICATIONS

International Search Report and Written Opinion issued in International Application No. PCT/GB2019/052606, mailed Nov. 27, 2019 (Nov. 20, 2019). 12 pages.

* cited by examiner though the desire to reduce carbon emissions increases. In such vehicles, the power that can be provided by, and the weight of, the battery is vital in determining the performance of the vehicle. The power to weight ratio of the battery is therefore something that vehicle designers are trying to optimise. This can clearly be done either by increasing the power generated for a given weight or by reducing the weight for a given power output, or most likely a combination of the two.

BATTERY COMPARTMENT

This invention relates to a battery compartment and, in particular, a battery compartment which contains a plurality of battery cells and through which, in use, coolant flows.

Electric powered or hybrid vehicles are well known and are becoming more and more prevalent as the desire to reduce carbon emissions increases. In such vehicles, the power that can be provided by, and the weight of, the battery is vital in determining the performance of the vehicle. The power to weight ratio of the battery is therefore something that vehicle designers are trying to optimise. This can clearly be done either by increasing the power generated for a given weight or by reducing the weight for a given power output, or most likely a combination of the two.

The batteries in electric or hybrid vehicles are typically made up of a plurality of individual battery cells connected together in such a way to allow large amounts of power to be provided to drive the wheels or power other systems in the vehicle. These cells are typically provided in the form of one or more battery modules which can be electrically connected.

Battery cells have optimum operating conditions and, in particular, operating temperatures. If the battery cells are outside of these optimum conditions, then the performance of the cells can deteriorate and the power the cells can provide is reduced. Alternatively or additionally, overheating can affect the operating life and/or general reliability of the battery cells, which is also undesirable.

It is known to provide cell trays having a plurality of holes or recesses for holding battery cells. Such cell trays allow coolant fluid to circulate around parts of the battery cells, thereby providing a cooling effect to the cells as heat is transferred from the cells to the coolant. It is known to use a pair of cell trays, one supporting each end of the battery cells, with the coolant fluid being permitted to flow over the central portion of each cell, but having the cell terminals of the cells, typically located at each end of the cell, covered.

The cell tray or trays are typically located within a housing into which the coolant fluid is supplied for circulation. Obtaining and maintaining sufficient circulation of the coolant fluid within the housing around the battery cells is important. The individual battery cells require controlling, for example to be activated or deactivated depending upon the amount of power that is required at any instant in time. Thus, electrical connections need to be provided from the individual cells to control electronics located outside of the battery module. It is also important to avoid where possible any leakage from within the battery module.

According to the present invention there is provided a battery compartment for holding a plurality of cells, the battery compartment comprising: a housing defining a chamber in which the plurality of cells are to be located; a cell tray for supporting the plurality of cells within the chamber; and a plurality of openings in a wall of the housing, each opening allowing the passage of electrical cabling through the wall and also coolant flow into or out of the chamber.

Such a battery compartment is beneficial as it reduces the number of openings from the housing, thereby reducing the opportunities for leakage.

The housing may be a battery module housing enclosing the cells of a single cell tray.

The plurality of openings may be a pair of openings in an end wall of the module housing, the end wall being transverse to the cell tray, one opening on each side of the cell tray. The pair of openings may be the only openings into the chamber.

The housing may be a battery housing enclosing the cells of multiple cell trays.

The plurality of openings are preferably a pair of openings in an end wall of the battery housing, the end wall being transverse to the cell tray, one opening on each side of the cell tray.

The support structure may form part of housing or may be entirely within the chamber.

One opening may be an inlet for coolant. One opening may be an outlet for coolant. A seal is preferably on each opening. The seal may include a sealing flange configured to allow the electrical cabling to pass therethrough. The seal may be a two part seal which sandwiches the electrical cabling.

The pair of openings are preferably the only openings into the chamber through which coolant is to pass. The openings may be elongate. The openings may be along the height of the end wall, which may be extending in a direction aligned with the cell tray. The openings may span the mid point of the height of the end wall. The openings may be at the same height.

The electrical cabling may be a flexible printed circuit board (FPC). The electrical cabling may wrap around one or more faces of the housing. An electrical control board may be connected to the electrical cabling and mounted on a different face of the housing to the openings. The different face is preferably an opposite end wall to that in which the openings are provided.

A coolant manifold may be provided for supplying coolant to and/or receiving coolant from the chamber. The electrical cabling may pass through an opening in the manifold. The electrical cabling may pass between the manifold and the housing.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Battery Overview

Figure 1:
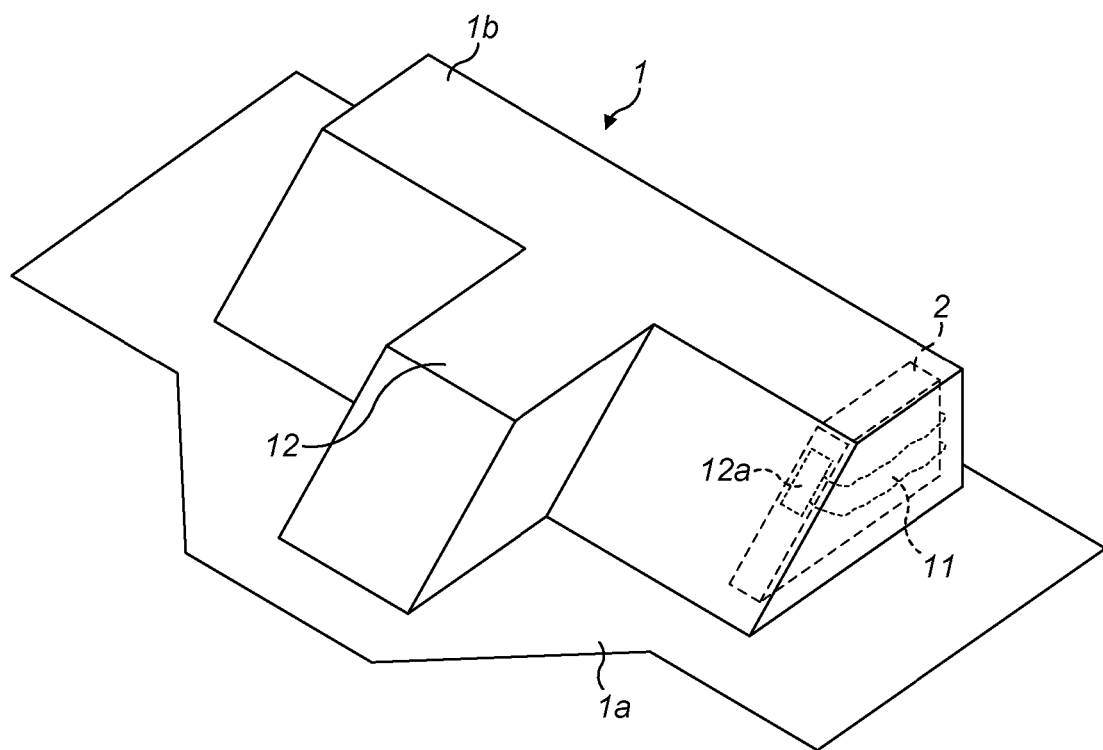
FIG. 1 shows a battery.

FIG. 1 shows a battery 1 which may comprise a number of identical battery modules 2. The battery modules may be arranged in a row. The battery may comprise any number of battery modules 2. In the example depicted in FIG. 1, one battery module 2 is shown for clarity, but in a preferred example there may be thirteen modules.

The battery may be installed in a vehicle. FIG. 1 shows the battery 1 fixed to a battery floor 1a. The battery floor 1a may be structurally integral to the vehicle in which the battery is installed. For example, the battery floor may be a load bearing component of a vehicle chassis. The battery floor 1a may be configured to be removably fitted to the vehicle so that the battery 1 can be removed from the vehicle. For example, for maintenance or replacement of the battery 1.

The battery 1 may further comprise a battery control unit 12 which protrudes from the row of battery modules. The battery control unit 12 may be electrically connected to one or more module control units 12a. Each battery module 2 may comprise an attached module control unit 12a. The battery control unit 12 may control each battery module control unit 12a. Each battery module control unit 12a may control the activity of the respective attached battery module. Each battery module control unit 12a may receive information concerning the operation of the respective attached battery module. The battery module control units 12a may process that information and feed that information to battery control unit 12.

The battery modules and battery control unit 12 may be enclosed by the battery floor 1a and a battery housing 1b.

Figure 2:
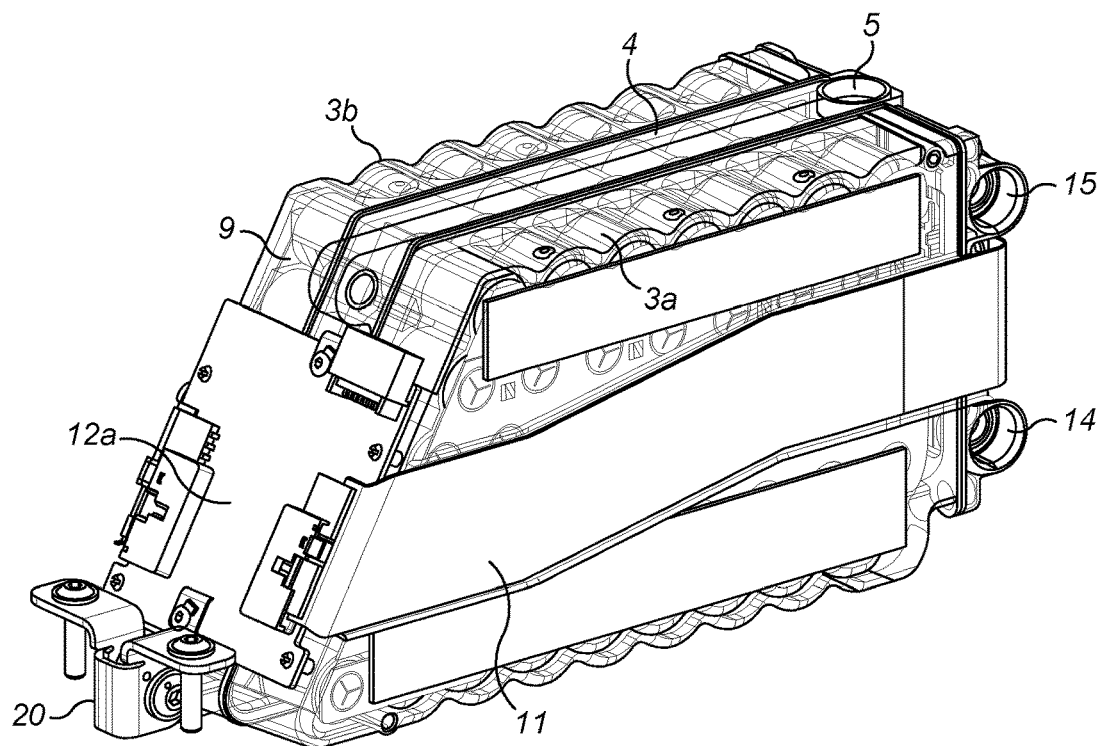
FIG. 2 shows a battery module from the front.

FIG. 2 shows a battery module 2 with a trapezoidal prism shape. The battery module depicted in FIG. 2 comprises a cell tray 4 and a two-part housing 3a, 3b. In FIG. 2, the battery module 2 and the cell tray 4 share a common longitudinal axis.

Cell Tray

Figure 4:
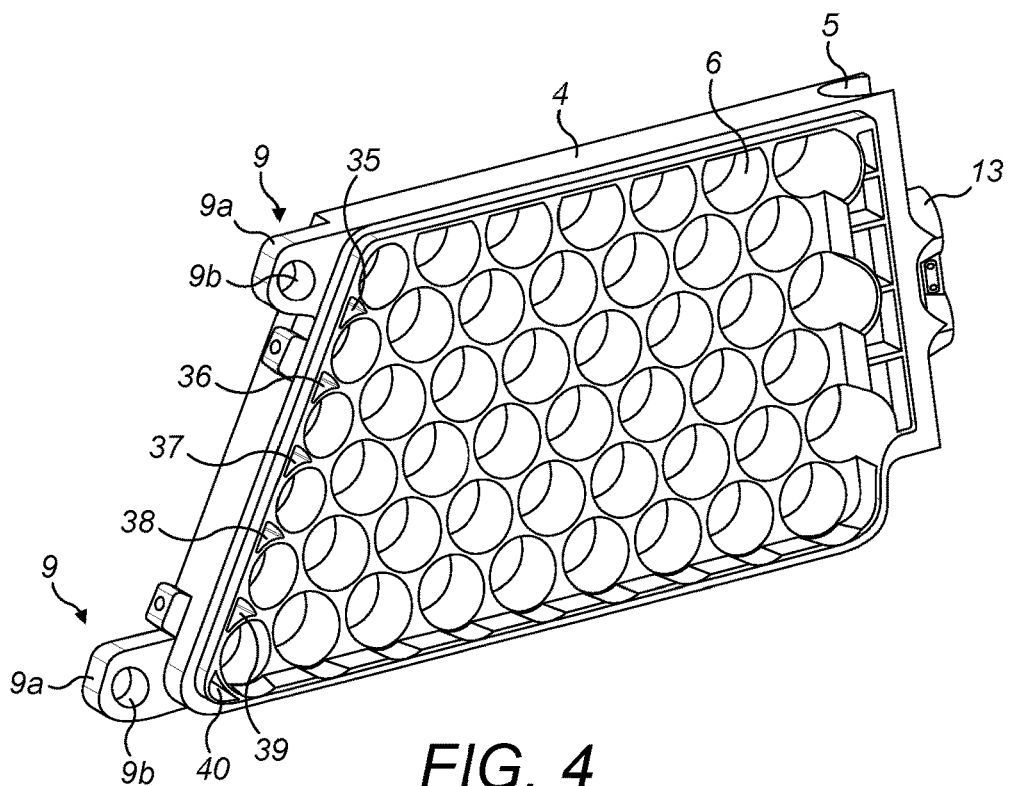
FIG. 4 shows a cell tray.

An exemplary cell tray 4 is shown in FIG. 4. The cell tray depicted in FIG. 4 comprises cell holes 6 for holding cells (not shown). Each cell hole 6 may extend through the cell tray in a direction perpendicular to the longitudinal axis of the cell tray. The cell tray may be formed of electrically insulating material.

The cell tray may further comprise a fixing hole 5 configured to receive a fixing element (not shown) for securing the cell tray 4, and hence the battery module 2, to the battery floor (not shown).

FIG. 4 shows the cell tray 4 comprising two fixings 9, each fixing comprising a tab 9a, the tab forming a connection hole 9b. Both fixings are generally positioned in the same plane as the cell tray. Each connection hole 9b may extend through its respective tab 9a in a direction parallel to the direction in which the cell holes 6 extend through the cell tray 4. The cell tray may comprise more than two fixings. The cell tray may comprise a single fixing. Fixings on multiple battery modules may receive one or more common elements so that the battery modules can be secured to one another.

Figure 5:
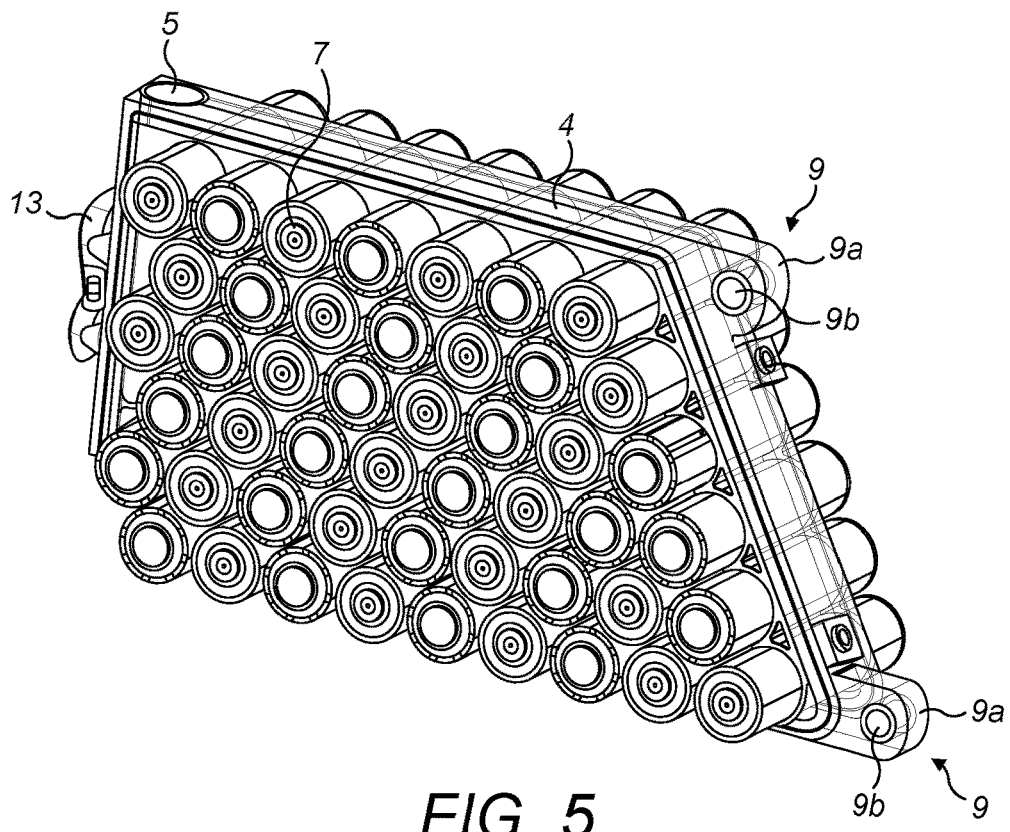
FIG. 5 shows a cell tray holding cells.

FIG. 5 shows a number of cells 7 being held in the cell holes 6 of the cell tray 4. The cell tray may be configured to hold any number of cells. In the example depicted in FIG. 5 there are forty-eight cells held in respective cell holes 6. Each cell hole may hold one cell.

Resin may be poured into a recessed side of the cell tray. The resin may harden around cells placed in the cell tray so as to secure the cells in the cell tray. Alternatively, each cell 7 may be held in a cell hole 6 by an interference fit between the cell tray 4 surrounding the cell hole and the cell inserted into the respective cell hole.

Each cell hole may extend through the cell tray in a direction perpendicular to the longitudinal axis of the cell tray. In the example cell tray depicted in FIGS. 4 and 5, each cell hole is cylindrical so as to accommodate cylindrical cells. In other examples, each cell hole may be prismatic so as to accommodate prismatic cells.

The length of each cell may be greater than the length of each cell hole. Each cell 7 comprises a positive terminal and negative terminal. When a cell 7 is inserted into a cell hole 6, a length of the cell 7 comprising the positive terminal of the cell may protrude from the cell hole on one side of the cell tray 4 whilst a length of the cell 7 comprising the negative terminal protrudes from the cell hole on the other side of the cell tray. The portion of the cell 7 comprising the positive terminal and the portion of the cell 7 comprising the negative terminal may protrude from opposite sides of the cell tray. The protruding length of the portion of the cell comprising the cell's positive terminal and the protruding length of the portion of the cell comprising the cell's negative terminal may be equal.

Figure 3:
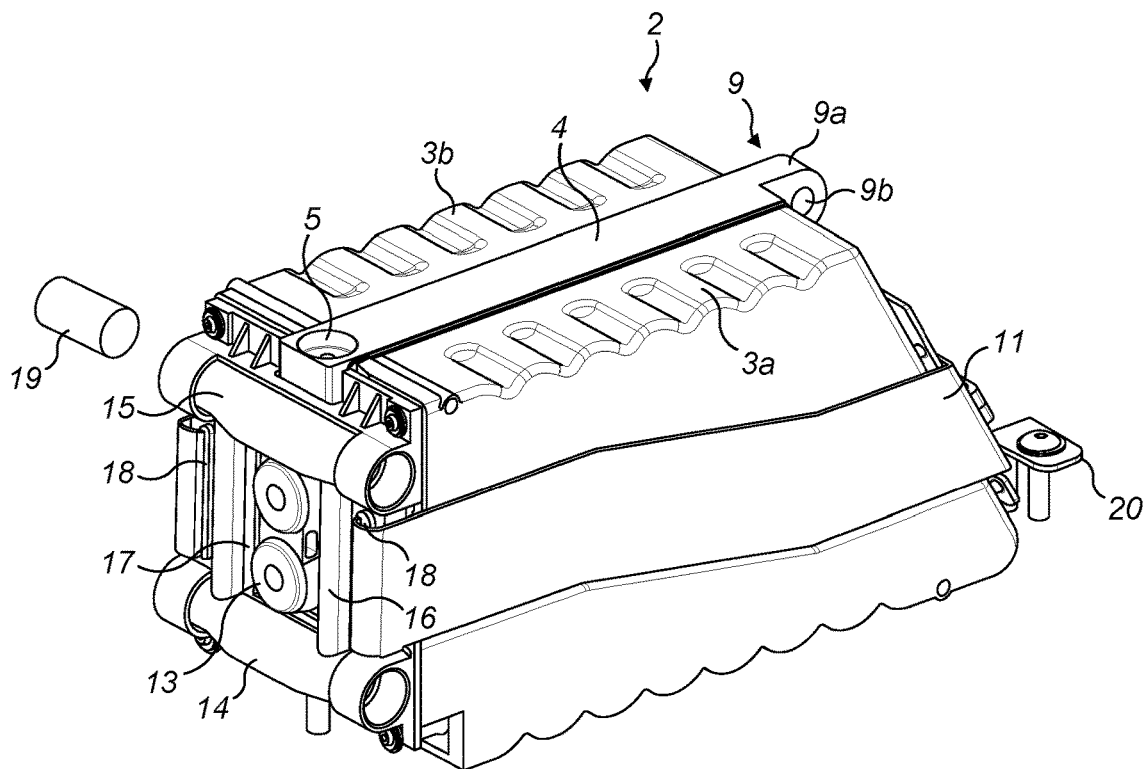
FIG. 3 shows a battery module from the back.

The battery module 2 shown in FIG. 2 comprises a two-part module housing 3a, 3b. The housing 3a, 3b may form two enclosed regions which contain the cells 7 held in the cell tray 4. In FIG. 2, one part of the module housing 3a encloses the portions of cells protruding on one side of the cell tray. The second part of the module housing 3b encloses the portions of the cells protruding on the opposite side of the cell tray. In FIGS. 2 and 3, the exterior faces of the battery module 2 comprise faces of the cell tray 4 and the housing 3a, 3b. Alternatively, the housing 3a, 3b may enclose the entirety of the cell tray. In this case, the exterior faces of the battery module would comprise faces of the housing 3a, 3b.

Cell to Cell Busbars and Flexible Printed Circuit Board

Figure 7:
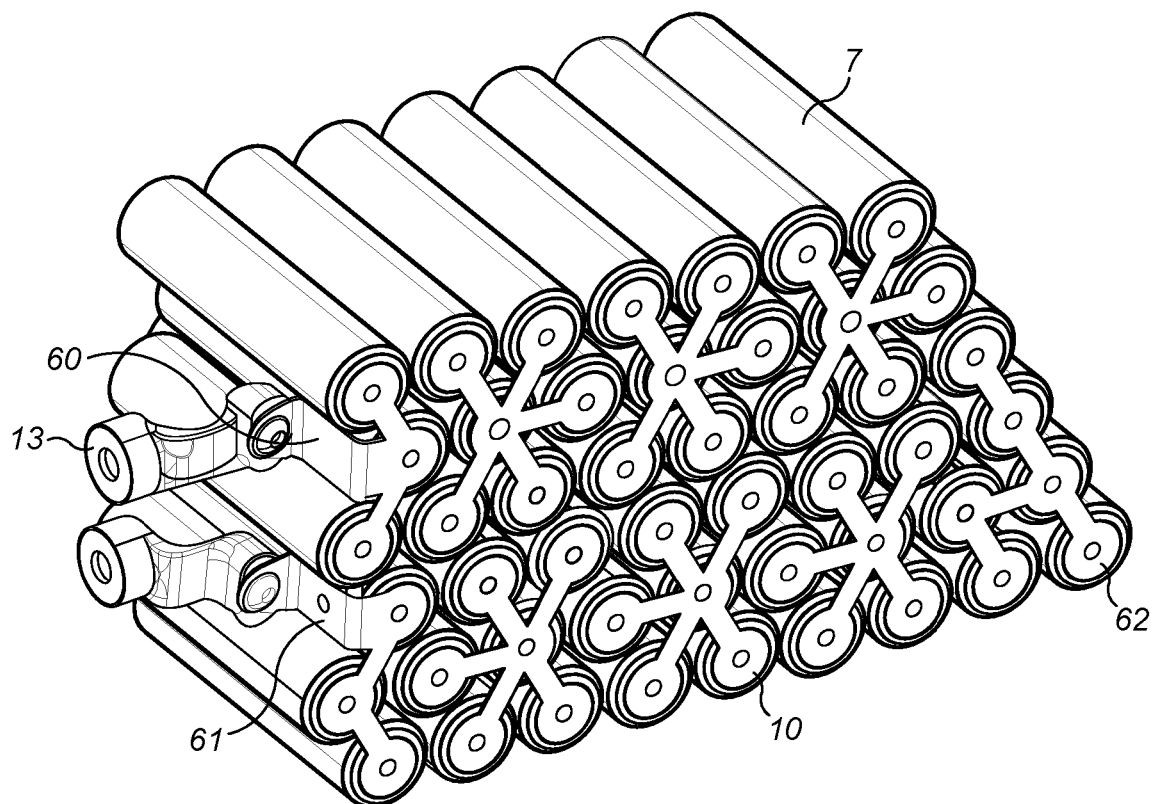
FIG. 7 shows the cells, busbars and module terminals of a battery module.

FIG. 7 shows busbars 10 contacting the terminals of multiple cells to form electrical connections between the multiple cells 7. The busbars 10 are formed of electrically conductive material. The busbars 10 may be formed of metal, for example copper or aluminium.

As above, the cell tray 4 (not shown in FIG. 7) fixedly holds cells 7, each cell having a positive terminal and a negative terminal. The busbars 10 may link the cell terminals of any number of cells.

Cells 7 may be arranged in the cell tray 4 so that positive and negative cell terminals protrude from opposite sides of the cell tray. In this way, a current flow path may be created through cells and busbars. For example, the current flow path may "snake" through the battery module. The current flow path may repeatedly intersect the cell tray. The current flow path may repeatedly intersect the longitudinal axis of the battery module. At least some of the cells may be connected in parallel by the busbars 10, meaning that the current flow path passes through multiple cells as the current flow path intersects the cell tray.

Module terminals 13 are shown in FIG. 7. The module terminals 13 are positioned on the back of the battery module and may be integral to the cell tray 4 (not shown in FIG. 7). Module terminals 13 of neighbouring battery modules may be electrically connected, for example, by module to module busbars. The module terminals 13 allow a supply of current to and/or from the cells 7 of the battery module 2.

Figure 6:
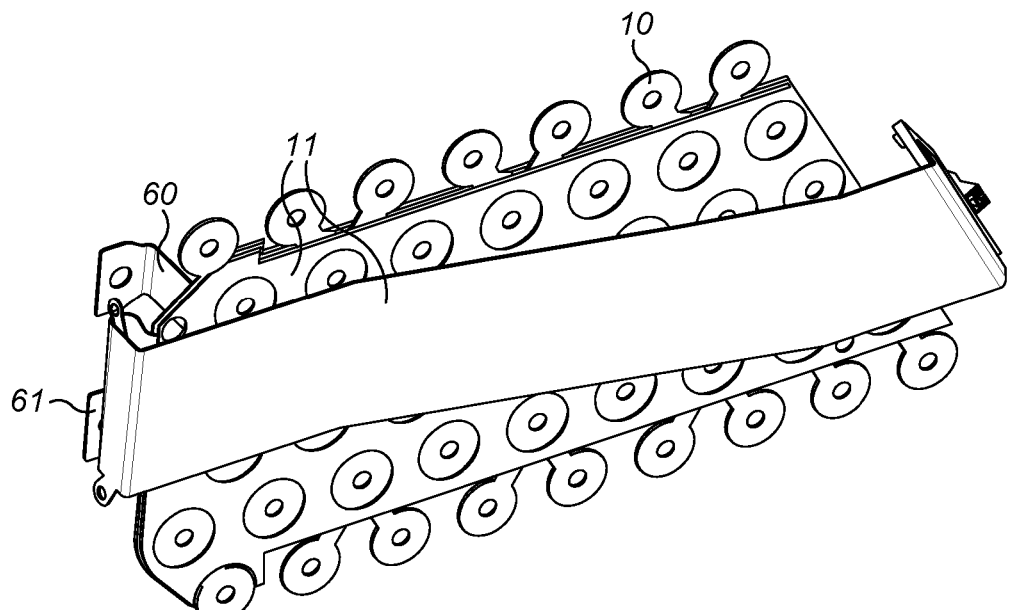
FIG. 6 shows the busbars and flexible printed circuit of a battery module.

The busbars 10 may be integrated with a flexible printed circuit board (not shown in FIG. 7). FIG. 6 shows the flexible printed circuit board 11 of a battery module. A portion of the flexible printed circuit board 11 is located in the region enclosed by the module housing and another portion of the flexible printed circuit board 11 is wrapped around the exterior faces of both parts of the two-part module housing 3a, 3b, also shown in FIGS. 2 and 3.

The busbars 10 shown in FIGS. 6 and 7 may be integrated with the flexible printed circuit board 11. The busbars 10 may be configured to conduct a high level of current between the cells of the module and the module terminals 13.

The flexible printed circuit board 11 shown in FIG. 6 may further comprise sense wires. The sense wires may be configured to conduct a low current signal. The sense wires in the flexible printed circuit board may be attached to voltage sensors. Each voltage sensor may be capable of determining the voltage at a point on the busbar. Each voltage sensor may be capable of determining the voltage being drawn from a cell. Each voltage sensor may be capable of inferring the voltage being drawn from a cell from a measurement taken of the voltage being drawn from a busbar 10. Each sense wire in the flexible printed circuit board may be capable of communicating voltage measurements from a voltage sensor to a module control unit 12a, shown in FIG. 1. The module control unit 12a may be capable of adapting the activity of the battery module in response to the voltage measurements provided by the sense wire. Each sense wire may be capable of communicating voltage measurements to the battery control unit. The module control unit 12a may be capable of communicating voltage measurements to the battery control unit. The battery control unit 12, also shown in FIG. 1, may be capable of adapting the activity of the battery module in response to the voltage measurements. The battery control unit 12 may be capable of adapting the activity of the battery in response to the voltage measurements.

The sense wires of the flexible printed circuit board 11 may be attached to one or more temperature sensors. A temperature sensor may be capable of determining the temperature of a part of the battery module. Each sense wire may be capable of communicating temperature measurements from a temperature sensor to the module control unit. The module control unit may be capable of adapting the activity of the battery module in response to the temperature measurements provided by the sense wire. Each sense wire may be capable of communicating temperature measurements to the battery control unit. The module control unit may be capable of communicating temperature measurements to the battery control unit. The battery control unit may be capable of adapting the activity of the battery module in response to the temperature measurements. The battery control unit may be capable of adapting the activity of the battery in response to the temperature measurements.

The sense wires may be attached to other types of sensors, for example current sensors, and/or fluid flow sensors.

FIGS. 6 and 7 also show terminal tabs 60, 61 which each of which connect either a positive or a negative end of the busbar to the respective positive or negative module terminal.

Module Cooling

It is known to supply coolant to regulate the temperature of batteries. In typical batteries, the coolant is confined within coolant jackets or pipes. In such batteries, cells are cooled in areas of the cell which make contact with the jacket or pipe containing the coolant. This is a slow and inefficient cooling method.

In other typical batteries, coolant is not confined by coolant jackets or pipes, but makes direct contact only with the body/centre portion of each cell. In such batteries, the cell terminals are protected so that coolant does not make contact with the cell terminals. Such contact is avoided as it would typically lead to electrical shorting. This is also an inefficient method because the cell terminals, being electrically connected, are often the hottest parts of the cell and yet they are not directly cooled by the coolant.

By contrast, in the battery module described herein, coolant supplied to the battery module 2 makes direct contact with cell terminals, flexible printed circuit board 11, busbars 10, and cell body. The entirety of the cell and connected conducting parts are bathed in coolant. The coolant used is a dielectric oil. Dielectric oils have insulating properties. Cells drenched in dielectric oil are insulated from one another preventing short circuiting between cells. This is an efficient method of regulating cell temperature. Such efficient cooling enables the cells to operate at a higher power and for longer. This means that fewer and/or smaller cells are required to generate the same power as batteries utilising the previously mentioned cooling methods.

FIG. 3 shows a supply coolant conduit portion 14 and a drain coolant conduit portion 15. In the exemplary configuration shown in FIG. 3, the supply coolant conduit portion 14 is positioned in a lower position and the drain coolant conduit portion 15 is positioned in an upper position. Such a configuration reduces the risk of air locks occurring during filling. Alternatively, the supply coolant conduit portion may be positioned in an upper position and the drain coolant conduit portion may be positioned in a lower position.

Both coolant conduit portions may extend along the battery module in a direction orthogonal to the longitudinal axis of the battery module. Both coolant conduit portions may extend along the battery module in a direction orthogonal to the direction in which the fixing hole 5 extends through the cell tray 4. Both coolant conduit portions may extend along the battery module in a direction parallel to the direction in which the cell holes 6 extend through the cell tray 4.

As shown in FIG. 3, the supply coolant conduit portion 14 is linked to an inlet 16 in the battery module so that coolant may be supplied to a region enclosed by the housing of the battery module. The drain coolant conduit portion 15 is linked to an outlet 17 so that coolant may be drained from a region enclosed by the housing of the battery module. Inlet 16 and outlet 17 are openings formed in the module housing. The coolant may be supplied to one of the two regions enclosed by the housing and be drained from the other of the two regions enclosed by the housing, one region being on an opposite side of the longitudinal axis of the cell tray to the other region. The cell tray 4 may comprise through-holes 35 to 40 for allowing the passing of coolant from a respective one of the said regions to the other of the said regions. The through-holes may be located in the cell tray 4 at the end of the cell tray 4 remote from the inlet 16 and outlet 17. The through-holes may be shaped to promote even fluid flow over the cells.

As shown in FIG. 1, battery 1 contains a number of battery modules 2 arranged in a row. When battery modules 2 are positioned in a row, a coolant conduit portion 14 of one battery module aligns with a coolant conduit portion of a neighbouring battery module. The two coolant conduit portions may be connected to one another by a coupler 19, shown in FIG. 3. Couplers 19 form liquid tight connections between coolant conduit portions so that coolant may flow from portion to portion. When supply coolant conduit portions 14 of the battery modules in the row of battery modules are connected by couplers 19, they form a supply coolant conduit 14*a* which extends along the length of the row of battery modules. When drain coolant conduit portions 14 of the battery modules in the row of battery modules are connected by couplers 19, they form a drain coolant conduit 15*a* which extends along the length of the row of battery modules.

As shown in FIG. 1, the longitudinal axes of all the battery modules 2 in the row of battery modules of the battery 1, may be parallel to one another. Both coolant conduits 14*a*, 15*a* may extend along the row of battery modules in a direction orthogonal to the longitudinal axes of the battery modules in the row of battery modules. Both coolant conduits may extend along the row of battery modules in a direction orthogonal to the direction in which the fixing hole 5 extends through the cell tray 4 of each battery module. Both coolant conduits may extend along the row of battery modules in a direction parallel to the direction in which the cell holes 6 extend through the cell tray 4 of each battery module.

Inlet 16 and outlet 17 may be configured to allow coolant to enter and leave the battery module 2. Inlet 16 and outlet 17 may further act as passages through which the flexible printed circuit boards 11 pass between the interior and exterior of the battery module, as shown in FIG. 3. The inlet 16 and outlet 17 may be the only openings in the two-part housing 3*a*, 3*b* of the battery module 2. FIG. 3 shows sealant 18 around the inlet 16 and outlet 17. Sealant 18 ensures that coolant inside the battery module does not leak from the battery module into other parts of the battery.

The method of direct cell cooling described herein also has further advantages in the case that excessive pressure builds up inside a cell. Each cell may comprise a cell vent port. In the case that excessive pressure builds up inside the cell, the cell vent port may be activated, allowing fluids within the cell to escape the cell. The cell vent port may be configured to expel cell fluids in the event that pressure within the cell exceeds a threshold. Upon leaving the cell, the fluids are quenched by the surrounding coolant.

Coolant Supply and Drain

Figure 8:
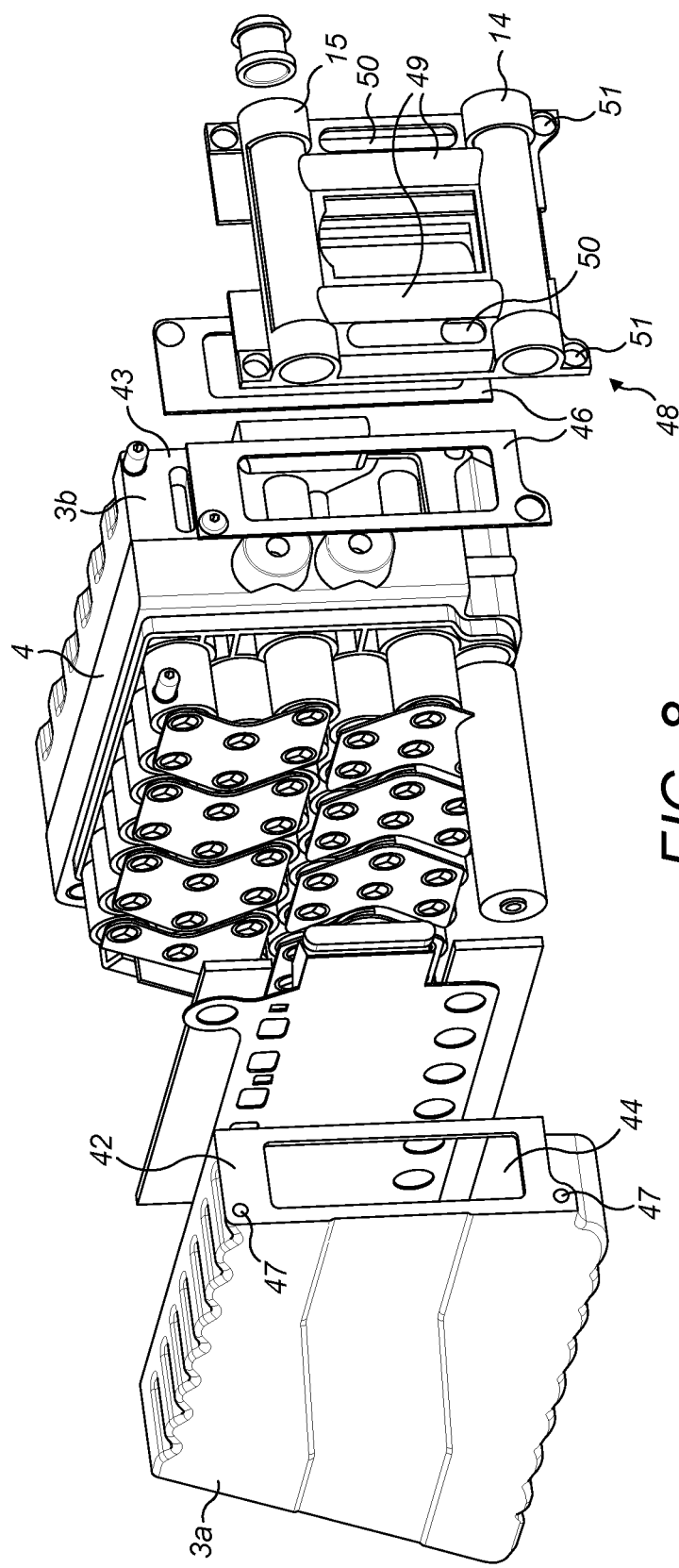
FIG. 8 shows an exploded view of a battery module.

FIG. 8 illustrates an exploded view of a battery module which in particular shows the mounting of the supply coolant conduit portions 14 and drain coolant conduit portions 15 on an end wall 40 of the module. As described above, the module has a two part housing formed of housing parts 3*a* and 3*b*. Part 3*a* is typically a mirror image of part 3*b*. For the purpose of FIG. 8, housing part 3*a* is located on the inlet side of the module, that is the side which receives coolant fluid from supply coolant conduit portion 14. Housing part 3*b* therefore is on the outlet side from which coolant is supplied to drain coolant conduit 15.

Each housing part 3*a*, 3*b* has a respective end wall 42, 43, each end wall having an opening 44, 45 therethrough. In this example, a single opening is provided in each end wall. The openings 44, 45 are the only openings in the housing through which coolant and/or electrical cabling can pass. Any other openings 47 through the housing wall are used for fixing the housing to the cell tray 4, to the other housing part or for the mounting of other components such as the coolant manifold 48 described below. The only openings through the housing parts into the region through which coolant flows are located in the end wall. FIGS. 2 and 3 illustrate how the FPC control boards are mounted on the face of the module opposite that through which the FPCs enter/exit the module. Thus, were there to be any leakage, that leakage would be as far as practical from the location of the control boards, thereby reducing the likelihood of damage to those boards.

The openings 44, 45 are elongate to allow for the passage of the FPCs 11 and one is provided on each side of the cell tray 4, so that the FPC from each side of the module has an exit path. The openings are located substantially centrally on the end wall, that is the openings span the mid-point of the height of the end wall in FIG. 8.

Each end wall is provided with a separate seal 46. It may be possible to use a single seal to cover the end walls of both housing parts, especially if the two housing parts abut against one another. In this example, the separate seals 46 surround respective openings 44, 45 and any fixing holes 47. Separate seals may be used for the fixing holes. By providing a single seal for each separate side of the module, i.e. a seal associated with each housing part 3*a*, 3*b*, the number of locations from which leakage can occur is minimised.

A coolant manifold 48 is then attached, by way of the fixing holes 47, 51, to the end walls. The manifold is fastened in such a way that the seals 46 are compressed and act to prevent leakage of coolant or waste products from within the battery module to the outside. The coolant manifold includes the supply coolant conduit 14 and drain coolant conduit 15. Whilst shown as a single part, the manifold could be in a plurality of sections, although this may require additional sealing elements.

The manifold has a pair of manifold FPC openings 50 through which respective FPCs 11 from each side of the battery module can pass. These openings are filled by sealant 18 which surrounds the respective FPC as it passes through the opening 44, 45 and prevents leakage of coolant through the manifold FPC openings 50.

Figure 9:
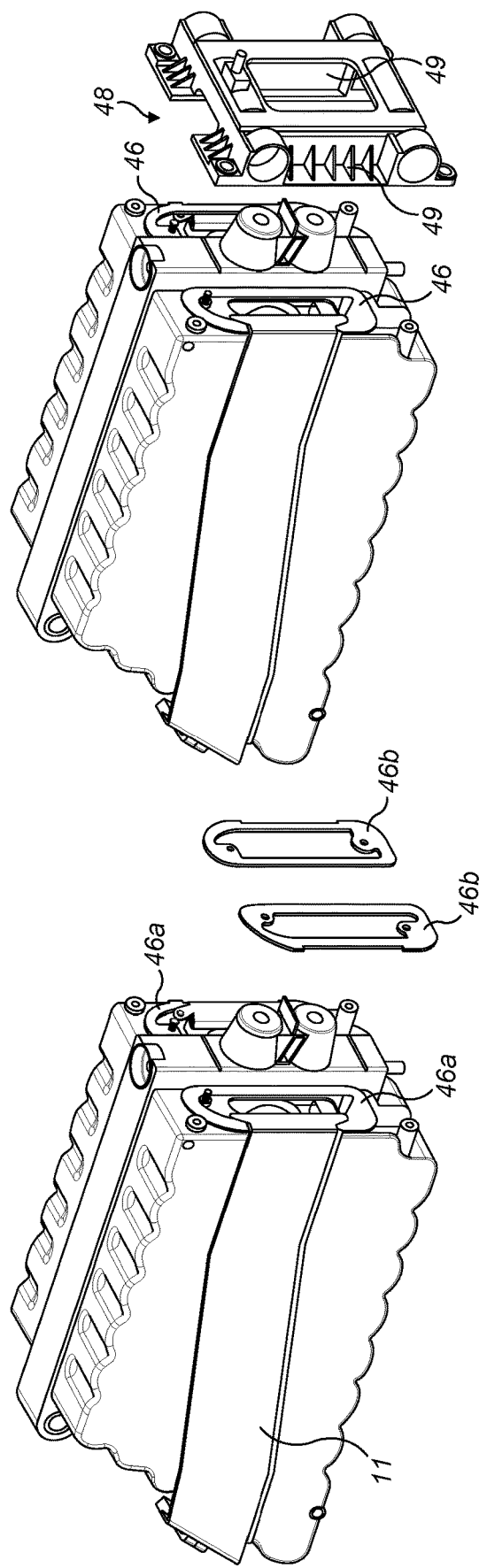
FIG. 9 shows an alternative coolant manifold arrangement.

An alternative manifold construction is shown in FIG. 9, in which no manifold FPC openings 50 are provided in the manifold end plate. Instead, the seal 46 for each opening 44, 45 comprises a pair of seals 46*a*, 46*b*. Seals 46*a* and 46*b* sandwich the respective FPC 11, such that seal 46*a* is adjacent the respective battery housing part around the opening 44, 45 and seal 46*b* is adjacent the coolant manifold 48. The FPC then passes between the two seals 46*a*, 46*b* and no manifold FPC openings 50 are required. By sandwiching the FPC 11 between the seals 46*a* and 46*b*, the risk of damage to the FPC is reduced when compared the FPC being against either the module housing or the coolant manifold. Furthermore, the seals 46*a*, 46*b* are typically formed from a compliant material which also provides a better seal than if the FPC lay against a more rigid structure such as the module housing or the coolant manifold.

In each example of the manifold, the manifold 48 has a pair of coolant pathways 49, 49*a*. Each coolant pathways extends from a different coolant conduit 14, 15, typically in a substantially perpendicular direction. Each coolant pathway is in fluid communication with only one of the coolant conduits, such that coolant flows either from the coolant supply conduit through the coolant pathway and into the battery module, or exits the battery module into the coolant pathway and then passes into the coolant drain conduit. The coolant pathways may be physically connected to each coolant conduit as shown in FIGS. 8 and 9, or may be physically connected only to the coolant conduit to which it is fluidly connected.

FIGS. 10*a* to 10*d* illustrate the form and shape of the region in which coolant flow within a module. Thus, FIG. 10 does not show the cell tray, cells or housing parts, but rather shows simply where the coolant would flow. Thus, holes 80 represent the locations of battery cells, so FIG. 10 shows clearly how the coolant flows around the outer surfaces of the individual cells and passes above, below and between the cells.

Figure 10A:
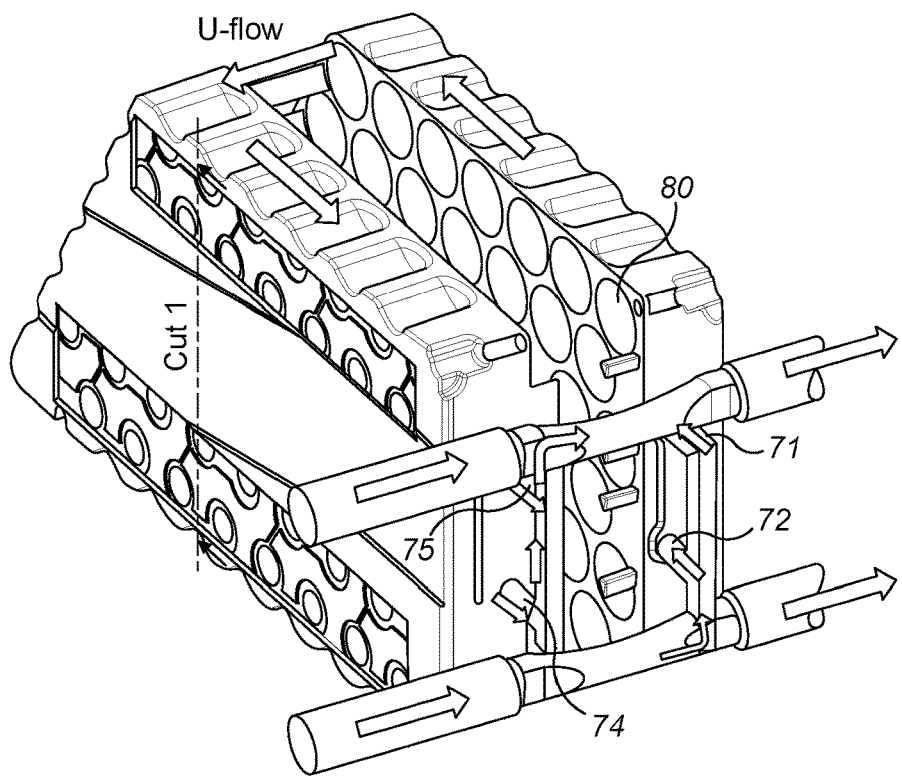
FIGS. 10*a* to 10*d* show the regions of coolant flow within a battery module.
Figure 10B:
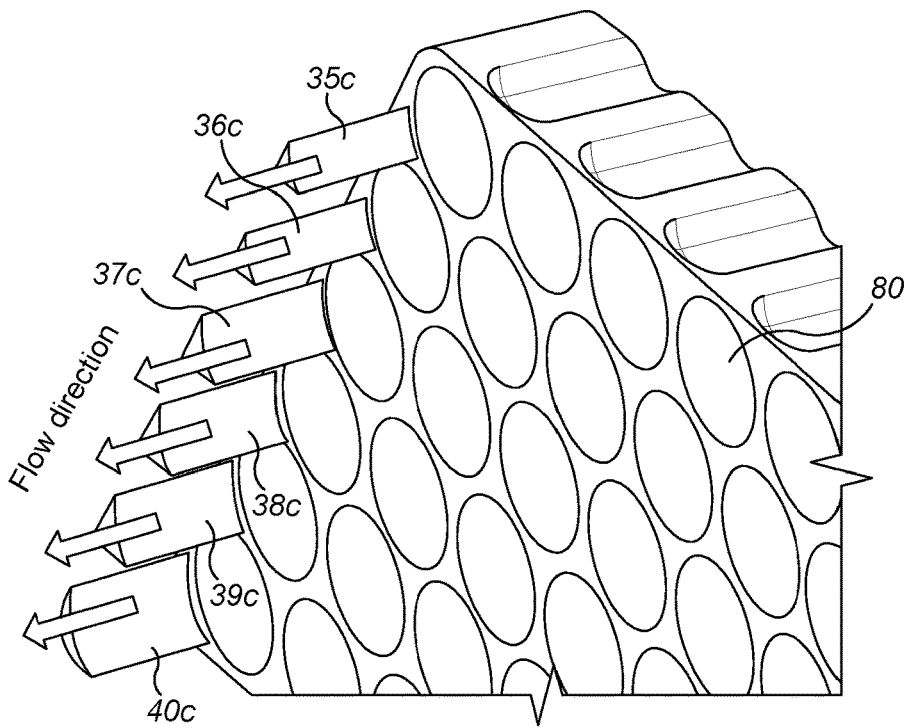

In FIG. 10b, sections 35c to 40c illustrate the flow through openings 35 to 40 within the distal end 62 of the cell tray 4, the openings permitting the coolant flow to pass from one side to the other of the cell tray as shown in FIG. 10a. Thus, the battery module has, as shown in FIG. 10d, an inlet side 63 which receives fresh coolant and an outlet side 64 from which used coolant is expelled from the battery module, and the coolant flow follows a U-shape through the module.

Figure 10C:
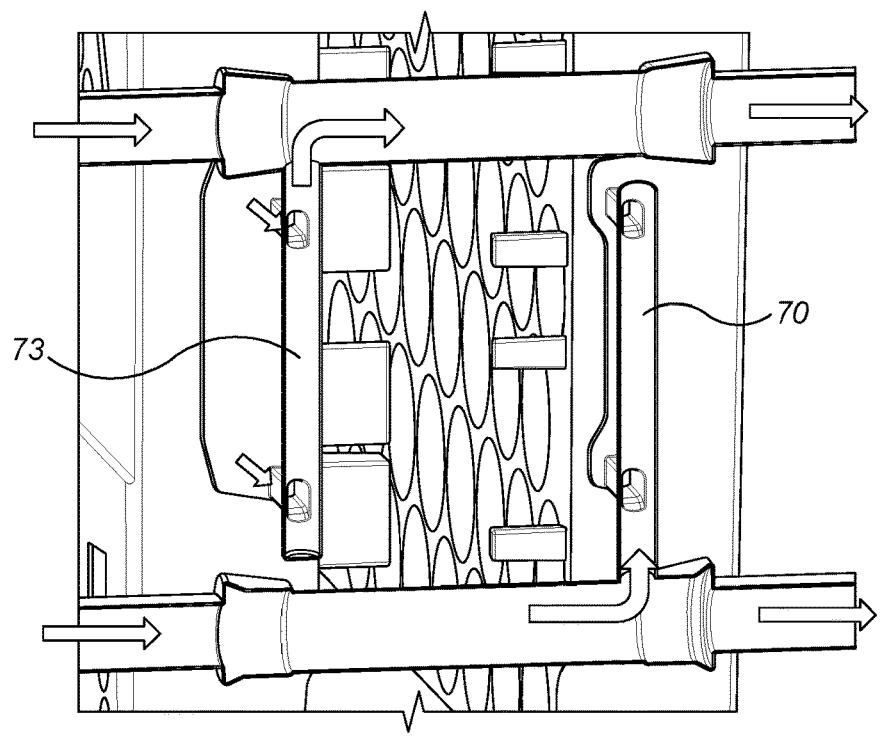
Figure 10D:
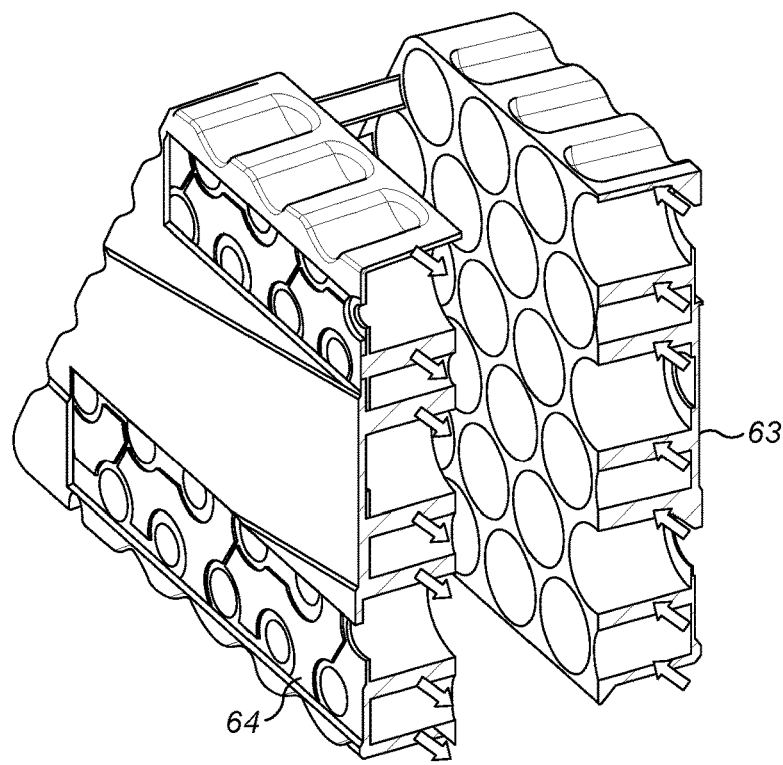

FIGS. 10a and 10c show in greater detail how the coolant passes between the battery module and the coolant conduits. In FIG. 10, the upper conduit 14 is the outlet or drain coolant conduit, and the lower conduit 15 is the inlet or supply coolant conduit. As mentioned previously, the coolant conduits may be the other way round with the supply at the top and the drain at the bottom.

FIGS. 10a and 10c further illustrate that the inlet conduit 15 is connected to an inlet pathway 70 extending substantially perpendicular to the inlet conduit 14, with the pathway having a pair of coolant inlets 71, 72, extending substantially perpendicular to the pathway, via which the coolant flows through the battery housing and into the battery module. Thus, the battery module has two locations through which coolant is supplied. Similarly, the outlet conduit 15 is connected to an outlet pathway 73 extending substantially perpendicular to the outlet conduit 15, with the pathway having a pair of coolant outlets 74, 75, extending substantially perpendicular to the pathway, via which the coolant flows from the battery module into the outlet pathway. Thus, the battery module has two locations through which coolant is expelled.

Whilst openings 42, 43 through the housing parts 3a, 3b are each shown as single discrete openings through which both coolant and the FPCs pass, the same effect can be achieved with separate openings for the coolant flow and the FPCs through each housing part 3a, 3b. In this arrangement, it is preferable to use a single seal 46 (which may be made up of seals 46a, 46b) surrounding all of the openings on each side of the module to minimise complexity during assembly. Importantly, in this arrangement, it is still possible to keep the FPC control boards on the opposite face to the openings 42, 43

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A battery compartment for holding a plurality of cells, the battery compartment comprising:
 a housing defining a chamber in which the plurality of cells are to be located;
 a cell tray for supporting the plurality of cells within the chamber; and
 a plurality of openings in a wall of the housing, each opening of the plurality of openings allowing electrical cabling to pass through the wall and also coolant to flow into or out of the chamber.

2. The battery compartment according to claim 1, wherein the housing is a battery module housing enclosing the cells of a single cell tray.

3. The battery compartment according to claim 2, wherein the plurality of openings are a pair of openings in an end wall of the housing, the end wall being transverse to the cell tray, one opening of the pair of openings being on each side of the cell tray.

4. The battery compartment according to claim 3, wherein the pair of openings are the only openings into the chamber.

5. The battery compartment according to claim 1, wherein the housing is a battery housing enclosing the cells of multiple cell trays.

6. The battery compartment according to claim 1, wherein the cell tray forms part of the housing.

7. The battery compartment according to claim 1, wherein the cell tray is entirely within the chamber.

8. The battery compartment according to claim 1, wherein one opening of the plurality of openings is an inlet for coolant and one opening of the plurality of openings is an outlet for coolant.

9. The battery compartment according to claim 1, further comprising a seal on each opening.

10. The battery compartment according to claim 9, wherein the seal includes a sealing flange configured to allow the electrical cabling to pass therethrough.

11. The battery compartment according to claim 9, wherein the seal is a two part seal which sandwiches the electrical cabling.

12. The battery compartment according to claim 1, wherein the plurality of openings are elongate.

13. The battery compartment according to claim 1, wherein the electrical cabling is a flexible printed circuit board (FPC).

14. The battery compartment according to claim 1, wherein the electrical cabling wraps around one or more faces of the housing.

15. The battery compartment according to claim 1, further comprising an electrical control board connected to the electrical cabling and mounted on a different face of the housing to the plurality of openings.

16. The battery compartment according to claim 15, wherein the different face is an opposite end wall to that in which the plurality of openings are provided.

17. The battery compartment according to claim 1, further comprising a coolant manifold for supplying coolant to and/or receiving coolant from the chamber.

18. The battery compartment according to claim 17, wherein the electrical cabling passes through an opening in the manifold.

19. The battery compartment according to claim 17, wherein the electrical cabling passes between the manifold and the housing.

* * * * *